US009834308B2

(12) United States Patent
Henshaw et al.

(10) Patent No.: US 9,834,308 B2
(45) Date of Patent: *Dec. 5, 2017

(54) AIRCRAFT PASSENGER SEAT CENTER CONSOLE UNIT

(71) Applicant: B/E Aerospace, Inc., Wellington, FL (US)

(72) Inventors: Robert J. Henshaw, Newnan, GA (US); Mark A. Kruse, Atlanta, GA (US); Suzuko Hisata, Atlanta, GA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,447

(22) Filed: Sep. 30, 2016

(65) Prior Publication Data
US 2017/0015420 A1    Jan. 19, 2017

Related U.S. Application Data

(63) Continuation-in-part of application No. 14/667,133, filed on Mar. 24, 2015.

(60) Provisional application No. 61/970,531, filed on Mar. 26, 2014.

(51) Int. Cl.
B64D 11/06    (2006.01)
B64D 11/00    (2006.01)

(52) U.S. Cl.
CPC .... *B64D 11/0606* (2014.12); *B64D 11/00152* (2014.12); *B64D 11/0624* (2014.12); *B64D 11/0626* (2014.12); *B64D 11/0638* (2014.12); *B64D 11/0646* (2014.12)

(58) Field of Classification Search
CPC ....... B64D 11/00; B64D 11/003; B64D 11/06; B64D 11/0602; B64D 11/0606; B64D 11/0624; B64D 11/0627; B64D 11/0638; B64D 11/0646; B64D 11/0023
See application file for complete search history.

(56) References Cited

U.S. PATENT DOCUMENTS 3,583,760 A * 6/1971 McGregor ............. A47B 5/006
                                                      297/145
3,632,161 A * 1/1972 Arfaras .................... A47C 7/70
                                                      297/145
3,893,729 A * 7/1975 Sherman ............ B64D 11/0693
                                                      244/118.6

(Continued)

OTHER PUBLICATIONS

International Search Report for PCT/US2015/022180 dated Jun. 29, 2015.

Primary Examiner — Tien Q Dinh
Assistant Examiner — Michael A. Fabula
(74) Attorney, Agent, or Firm — Shumaker, Loop & Kendrick, LLP

(57) ABSTRACT

An aircraft seating group has first and second laterally-adjacent passenger seats; a center console positioned between the first and second passenger seats; a center console disposed between the first and second laterally-adjacent passenger seats and having a shelf for supporting a handheld electronic device at approximately an eye level of a passenger in the first passenger seat. The center console may further include a retention system to maintain the electronic device in the shelf in a position allowing the passenger to comfortably view the screen of the electronic device.

19 Claims, 13 Drawing Sheets

(56) References Cited

U.S. PATENT DOCUMENTS

| | | | | |
|---|---|---|---|---|
| 4,440,443 A * | 4/1984 | Nordskog | ............... | A47C 7/38 297/217.4 |
| 6,059,364 A * | 5/2000 | Dryburgh | ............. | A47C 1/0352 105/322 |
| 7,178,871 B1 * | 2/2007 | Round | ................. | B60N 2/242 297/217.3 |
| 7,578,470 B2 * | 8/2009 | Plant | ...................... | B64D 11/06 244/118.6 |
| 8,596,206 B2 * | 12/2013 | Legeay | ................. | B60N 3/002 108/137 |
| 8,690,254 B2 * | 4/2014 | Cailleteau | ............. | B64D 11/06 244/118.6 |
| 9,150,129 B2 * | 10/2015 | Suhre | ................... | B60N 2/4606 |
| 9,200,796 B2 * | 12/2015 | Ehrmann | ............... | F21V 33/00 |
| 9,216,665 B2 * | 12/2015 | Herault | .................... | B60N 2/00 |
| 9,533,765 B2 * | 1/2017 | Vergnaud | ............... | B64D 11/06 |
| 9,545,999 B2 * | 1/2017 | Henshaw | ........... | B64D 11/0601 |
| 2002/0066392 A1 * | 6/2002 | Calam | ................... | B60N 2/468 108/33 |
| 2003/0085597 A1 * | 5/2003 | Ludeke | ................. | B64D 11/06 297/184.14 |
| 2003/0188672 A1 * | 10/2003 | Parent | ................ | B64D 11/0638 108/134 |
| 2006/0219843 A1 * | 10/2006 | Martin | ................... | B60N 2/34 244/118.6 |
| 2006/0288377 A1 * | 12/2006 | Hsieh | ..................... | H04N 5/765 725/76 |
| 2007/0085389 A1 * | 4/2007 | Schurg | .................. | B64D 11/06 297/184.1 |
| 2007/0246981 A1 * | 10/2007 | Plant | ..................... | B64D 11/06 297/248 |
| 2008/0252109 A1 * | 10/2008 | Salzer | ..................... | B60N 2/46 297/173 |
| 2009/0121523 A1 * | 5/2009 | Johnson | ................. | B60N 3/004 297/140 |
| 2009/0146004 A1 * | 6/2009 | Plant | ..................... | B64D 11/06 244/118.5 |
| 2009/0146006 A1 * | 6/2009 | Park | ....................... | B60N 2/345 244/118.6 |
| 2009/0243352 A1 * | 10/2009 | Cailleteau | ............. | B64D 11/06 297/188.01 |
| 2009/0302158 A1 * | 12/2009 | Darbyshire | ........... | B64D 11/06 244/118.6 |
| 2010/0252680 A1 * | 10/2010 | Porter | .................... | B60N 2/01 244/118.6 |
| 2011/0156450 A1 * | 6/2011 | Collins | .................. | B60N 3/002 297/135 |
| 2011/0186682 A1 * | 8/2011 | Collins | .................. | B64D 11/06 244/118.6 |
| 2011/0210204 A1 * | 9/2011 | Collins | .................. | B64D 11/06 244/118.6 |
| 2012/0104165 A1 * | 5/2012 | Dobrusin | ............... | B64D 11/06 244/118.6 |
| 2012/0133180 A1 * | 5/2012 | Moulton | ............ | B64D 11/0605 297/135 |
| 2012/0167807 A1 * | 7/2012 | Legeay | .................. | B60N 3/002 108/41 |
| 2012/0292957 A1 * | 11/2012 | Vergnaud | ............... | B64D 11/06 297/188.08 |
| 2012/0298798 A1 * | 11/2012 | Henshaw | ............... | B64D 11/06 244/118.6 |
| 2012/0318918 A1 * | 12/2012 | Johnson | ................. | B64D 11/06 244/118.6 |
| 2013/0076082 A1 * | 3/2013 | Herault | .................... | B60N 2/00 297/173 |
| 2013/0093221 A1 * | 4/2013 | Ligonniere | ............ | B64D 11/06 297/173 |
| 2013/0106156 A1 * | 5/2013 | Orson | ................... | B64D 11/06 297/217.3 |
| 2013/0241258 A1 * | 9/2013 | Wallace | ................. | A47C 17/12 297/354.13 |
| 2013/0248655 A1 * | 9/2013 | Kroll | ..................... | B64D 11/06 244/118.6 |
| 2013/0320724 A1 * | 12/2013 | Plant | ..................... | B64D 11/06 297/232 |
| 2013/0343072 A1 * | 12/2013 | Ehrmann | ................ | F21V 33/00 362/471 |
| 2014/0300148 A1 * | 10/2014 | Frost | ..................... | B64D 11/06 297/173 |
| 2014/0300152 A1 * | 10/2014 | Park | ...................... | B64D 11/06 297/232 |
| 2014/0361585 A1 * | 12/2014 | Henshaw | ................ | B60N 2/01 297/174 R |
| 2015/0001341 A1 * | 1/2015 | Ersan | .................... | B64D 11/06 244/118.6 |
| 2015/0151652 A1 * | 6/2015 | Jerome | .................... | B60N 2/10 297/325 |
| 2015/0166183 A1 * | 6/2015 | Henshaw | ........... | B64D 11/0601 244/118.6 |
| 2015/0210393 A1 * | 7/2015 | Savian | ............... | B64D 11/0601 244/118.6 |
| 2015/0274299 A1 * | 10/2015 | Henshaw | ........... | B64D 11/0606 244/118.6 |
| 2015/0321592 A1 * | 11/2015 | De Morais | ............. | B64D 11/06 297/147 |
| 2016/0059966 A1 * | 3/2016 | Dryburgh | ................ | B64D 11/00 244/118.6 |
| 2016/0083096 A1 * | 3/2016 | Gagnon | ................. | B64D 11/06 108/20 |
| 2016/0167555 A1 * | 6/2016 | Allen | .................... | B60N 3/004 108/40 |
| 2017/0015420 A1 * | 1/2017 | Henshaw | ........... | B64D 11/0606 |

\* cited by examiner

AIRCRAFT PASSENGER SEAT CENTER CONSOLE UNIT

CROSS-REFERENCE TO RELATED APPLICATIONS

This application is a continuation-in-part of and claims priority to U.S. patent application Ser. No. 14/667,133 entitled "Deployable Center Console Shelf" and filed Mar. 24, 2015, which claims priority to U.S. Provisional Application No. 61/970,531, filed Mar. 26, 2014, the contents of both which are incorporated by reference in their entirety.

BACKGROUND

Aircraft seating arrangements commonly include multiple rows of laterally adjacent seats. Economy class seats within the same row often share common frame members such as beam tubes, armrests, and supportive legs, while first and premium class seats typically each have their own seat base frame. In either seating class, laterally-adjacent seats can be provided with a rear privacy shell that provides privacy between the row to which it is attached and an aft-positioned row. While the backside of the privacy shell is often used to support amenities for aft-seated passengers, such as video monitors, tray tables and storage pockets, up until the present disclosure the front side of the privacy shell was yet to be utilized for serving the forward-seated passengers.

In either seating class, laterally-adjacent seats may be separated by armrests, and in some cases, center consoles including armrests. Center consoles not only space laterally adjacent seats farther apart, they also function to house seat controls, seat amenities, armrests and storage compartments. Thus, center consoles not only provide a degree of separation and privacy for passengers, they improve the flying experience.

With advancements in smart phone and tablet technology, it has become commonplace for passengers to bring aboard their own personal electronic devices for use during a flight to watch movies, work, and play games. When using electronic devices to watch movies, it is not necessary to continuously handle the device, thus it would be desirable to have a place to support the tablet at an angle comfortable for viewing. This would free the passenger's hands, allowing the passenger to do other things such as eat and drink without having to disrupt the viewing experience.

While tablet holders exist for holding tablets against the seat back of a forward positioned seat, conventional solutions are tablet specific and cannot serve all rows, particularly the first row of each seating class. Further, seat back holders require that the passenger remain forward facing, and thus are not able to accommodate side facing or laying sitting positions.

Therefore, what is needed is another solution for supporting tablets and other items at a comfortable viewing angle that gives a seated passenger options in their sitting position.

SUMMARY OF ILLUSTRATIVE EMBODIMENTS

The present disclosure relates generally to an aircraft passenger seat arrangement and seat amenities associated with aircraft passenger seats, and more particularly, to a stowage shelf incorporated into a center console rear privacy shell of laterally adjacent passenger seats, the stowage shelf configured to deploy to support a personal electronic device such as a tablet computer in a position to be viewed by a passenger in a reclined sitting position laying facing the center console.

It is an object of the disclosure to provide a center console for being positioned laterally adjacent an aircraft passenger seat or between laterally-adjacent passenger seats within the same row of seats that increases viewing comfort and privacy for the passenger.

In one aspect, the present disclosure relates to a center console for being positioned alongside a passenger seat and including a deployable shelf.

In one aspect, the present disclosure relates to a center console including a deployable shelf configured to hold a tablet for viewing by a sitting or laying passenger facing in the direction of the shelf.

In one aspect, the present disclosure relates to a center console that extends forward from a rear privacy shell positioned behind a pair of laterally-adjacent seats, the center console including a deployable shelf configured to pivot down from a stowed position in which the shelf is generally vertical to a deployed position in which the shelf is generally horizontal, the shelf serving one of the laterally-adjacent seats, for example, to hold a tablet or other electronic device for viewing.

In one aspect, the present disclosure relates to a center console for serving laterally-adjacent passenger seats, the center console including a vertical privacy partition dividing the center console by extending forward from a rear privacy shell positioned behind the laterally-adjacent seats, each side of the center console including storage space and a deployable shelf for supporting a tablet for viewing by a sitting or laying passenger facing the shelf.

In one aspect, the present disclosure relates to an aircraft seating group including first and second laterally-adjacent passenger seats, a center console positioned between the first and second laterally-adjacent passenger seats, a rear privacy shell positioned behind the first and second laterally-adjacent passenger seats forming part of the center console, a vertical partition extending forward from the rear privacy shell to divide the center console, and a deployable shelf positioned to one side of the vertical partition configured to stow against the rear privacy shell and deploy to a horizontal position forward of the rear privacy shell. The deployable shelf may being pivotably attached at one end to the rear privacy shell such that the deployable shelf pivots between the stowed position against the rear privacy shell and the deployed horizontal position forward of the rear privacy shell. The deployable shelf may take the form of a tray having a bottom with upwardly extending sidewalls along at least two sides of the tray. One of the sidewalls may be interrupted by a cable passage for allowing a cable to pass there through. The deployable shelf positioned vertically above a control panel including an electronic port for receiving cabling, such as a USB cable or micro-USB cable.

In some embodiments, the deployable shelf has a user-manipulable deployment control at one end for moving the deployable shelf between the stowed and deployed positions.

In some embodiments, the vertical partition is topped with a horizontal roof.

In a further aspect, the present disclosure relates to a seating group including a deployable shelf positioned to either side of the vertical partition.

In some embodiments, the deployable shelf, when deployed in the horizontal position, may be vertically lower than a headrest of the respective one of the first and second laterally-adjacent seats that the deployable shelf serves.

In one aspect, the present disclosure relates to a console being positioned alongside an aircraft passenger seat having a rear privacy shell, where the console may include a vertical partition extending forward from the rear privacy shell and a deployable shelf positioned to one side of the vertical partition, and the deployable shelf may be configured to stow against the rear privacy shell and deploy to a horizontal position forward of the rear privacy shell.

In a one aspect, the present disclosure relates to an aircraft seating group. The aircraft seating group may include first and second laterally-adjacent passenger seats; a center console positioned between the first and second laterally-adjacent passenger seats; a rear privacy shell positioned behind the first and second laterally-adjacent passenger seats, the rear privacy shell forming part of the center console; a vertical partition extending forward from the rear privacy shell to divide the center console; and a slidable shelf positioned to one side of the vertical partition, The slidable shelf may be configured to be slid from a drawn-in position to a drawn-out position. In the drawn-in position the slidable shelf, for example, is fully retracted within the rear privacy shell, and in the drawn-out position the slidable shelf protrudes from the rear privacy shell.

In a further aspect, the present disclosure relates to an aircraft seating group. The aircraft seating group may include first and second laterally-adjacent passenger seats; a center console positioned between the first and second laterally-adjacent passenger seats; a rear privacy shell positioned behind the first and second laterally-adjacent passenger seats, the rear privacy shell forming part of the center console; a vertical partition extending forward from the rear privacy shell to divide the center console; a deployable shelf positioned to one side of the vertical partition, the deployable shelf being configured to stow against the rear privacy shell and deployed to a substantially horizontal position forward of the rear privacy shell; and a retention system to maintain an electronic device in the deployable shelf in the substantially horizontal position.

In a further aspect, the present disclosure relates to an aircraft seating. The aircraft seating group may include first and second laterally-adjacent passenger seats; a pair of reclinable center consoles positioned between the first and second laterally-adjacent passenger seats; a seat back support to articulate the first passenger seat from a upright position to a reclined position, the seat back support forming part of a first reclinable center console of the pair of reclinable center consoles; a vertical partition extending forward from the seat back support to form the first reclinable center console and articulate the first reclinable center console in concert with the seat back support; and a deployable shelf positioned to one side of the vertical partition, the deployable shelf being configured to stow against the seat back support and deployed to a substantially horizontal position forward of the seat back support.

Embodiments of the disclosure can include one or more or any combination of the above features and configurations.

Additional features, aspects and advantages of the disclosure will be set forth in the detailed description which follows, and in part will be readily apparent to those skilled in the art from that description or recognized by practicing the innovations as described herein. It is to be understood that both the foregoing general description and the following detailed description present various embodiments, and are intended to provide an overview or framework for understanding the nature and character of the invention as it is claimed. The accompanying drawings are included to provide a further understanding of the various innovations, and are incorporated in and constitute a part of this specification.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where.

DETAILED DESCRIPTION

Figure 1:
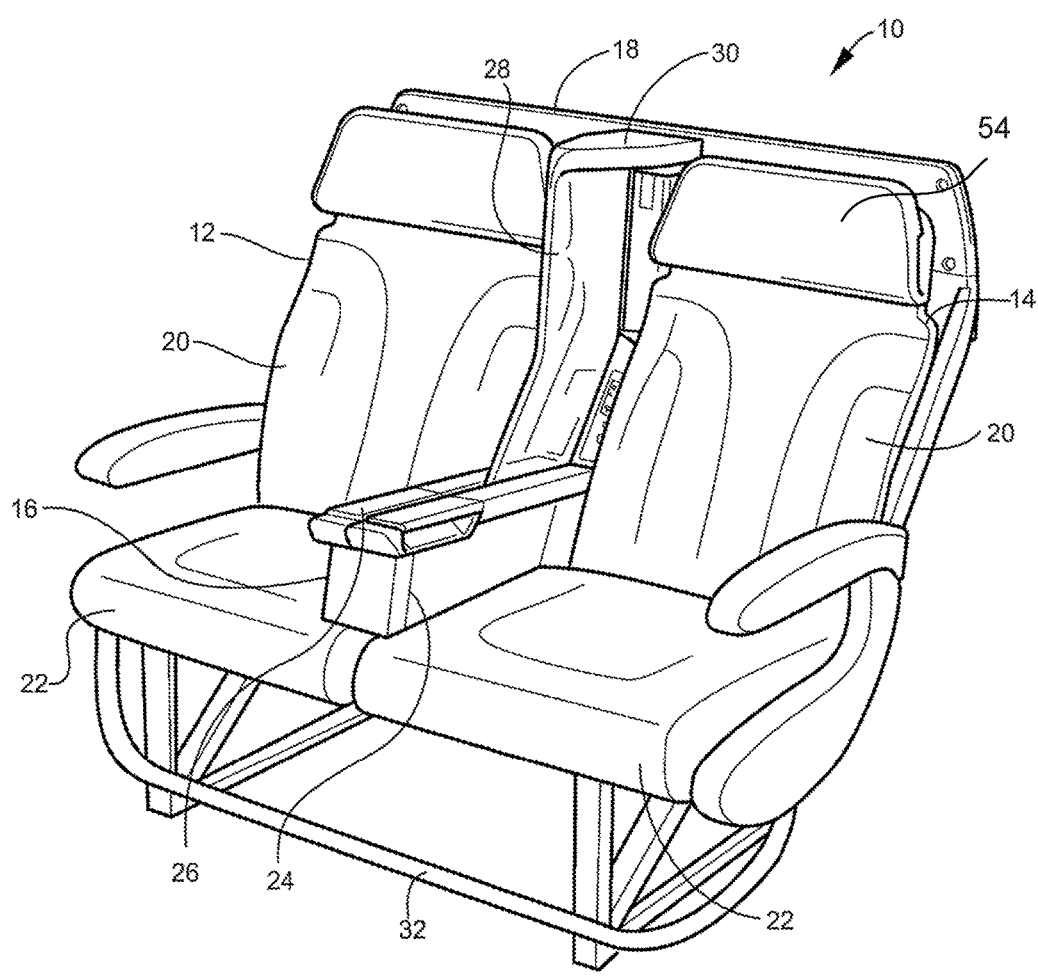
FIG. 1 is a perspective view of a seating group including laterally-adjacent seats separated by a center console including a deployable shelf according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

The present illustrative embodiments will now be described more fully hereinafter with reference to the accompanying drawings in which exemplary embodiments of the disclosure are shown. However, the innovations may be embodied in many different forms and should not be construed as limited to the representative embodiments set forth herein. The exemplary embodiments are provided so that this disclosure will be both thorough and complete, and will fully convey the scope of the innovations and enable one of ordinary skill in the art to make, use and practice the innovations. Like reference numbers refer to like elements throughout the various drawings.

Referring now to FIG. 1, in accordance with some implementations, a seating group 10 to provide better comfort and privacy is illustrated. For example, the seating group 10 generally includes first and second laterally-adjacent passenger seats 12, 14 separated by a center console 16. A rear privacy shell 18 is positioned behind the seat backs 20 and extends along a width of the seating group 10.

The rear privacy shell 18 may be formed from lightweight durable plastics or other material and may serve to house electronics, electrical connections, data connections, etc., as well as serve to support tray tables, storage compartments, etc., for use by aft-seated passengers in the row behind the seating group 10. The rear privacy shell 18 may be supported by the seat frame as shown, or may be freestanding on the floor. In other implementations, seating group 10 may include a greater number of seats and consoles than shown, for example, three seats and two center consoles between each seat. Alternatively, the seating group 10 may include a single seat and a console positioned adjacent to one side of the single seat.

Multiple like seating groups 10 may be arranged into rows to form a seating class with the aircraft cabin. The seating group 10 may further include a luggage retaining bar 32 that extends across the front of the seating group 10 elevated off the floor for preventing luggage stored beneath the passenger seats 12, 14 from sliding forward.

Each passenger seat 12, 14 can include a seat bottom 22 placed below a seat back 20, a headrest 54 placed above the seat back 20, and may optionally include a leg rest placed below the seat bottom. The passenger seats 12, 14 may be configured to selectively adjust between an upright position and a reclined position, and the reclining movement of the passenger seats 12, 14 may be independent of the rear privacy shell 18. In other words, the seat back 20 may recline while the rear privacy shell 18 remains stationary.

In some embodiments, the center console 16 can be divided into a lower console portion 24 and an upper console portion 28. For example, the lower console portion 24 can include armrests 26, and can house the seat controls and associated cabling, among other amenities. The lower console portion 24 can extend substantially along a length of the seat bottom 20 and spaces apart the laterally-adjacent seats 12, 14. The upper console portion 28 extends upwardly from the lower console portion 24 to about a top of the rear privacy shell 18, and forwardly from the rear privacy shell 18. The top of the upper console portion 28 extends left and right to form a roof 30 that further defines the underlying console space. Thus, the lower console portion 24 and the upper console portion 28 together form a partition that is substantially placed between hips and upper body parts of adjacent passengers in the passenger seats 12, 14.

The upper console portion 28 and the rear privacy shell 18, in some implementations, cooperatively define a space for locating a shelf 34, and beneath the shelf 34 can be located seat electronics, electrical connections (e.g., AC outlet), data connections (e.g., USB port, micro-USB port, etc.), audio connector (e.g., headphone jack), volume controls, etc.

Figure 2:
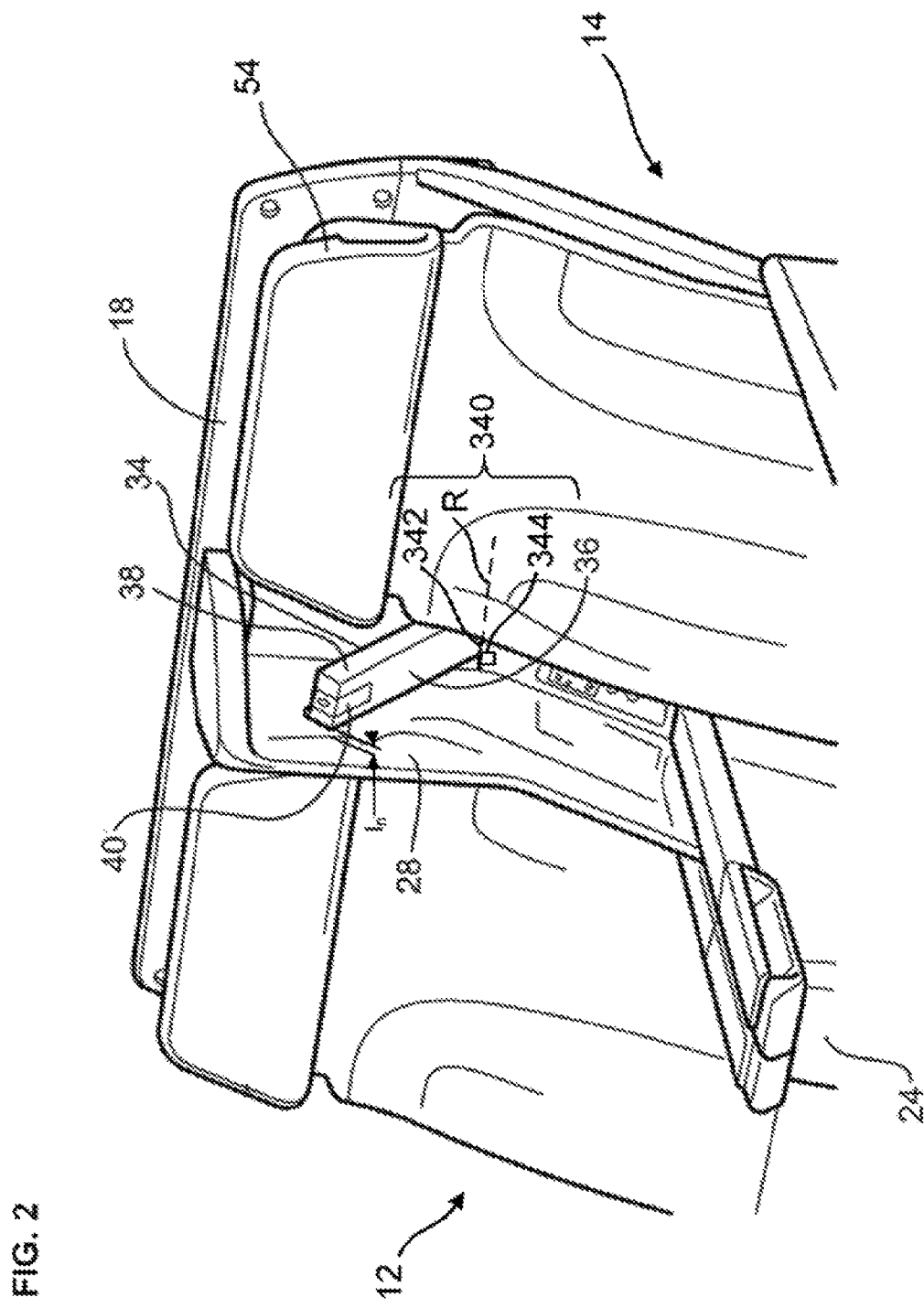
FIG. 2 is a detailed view of the seating group showing the deployable shelf partly deployed, according to certain aspects of the disclosure.
Figure 3:
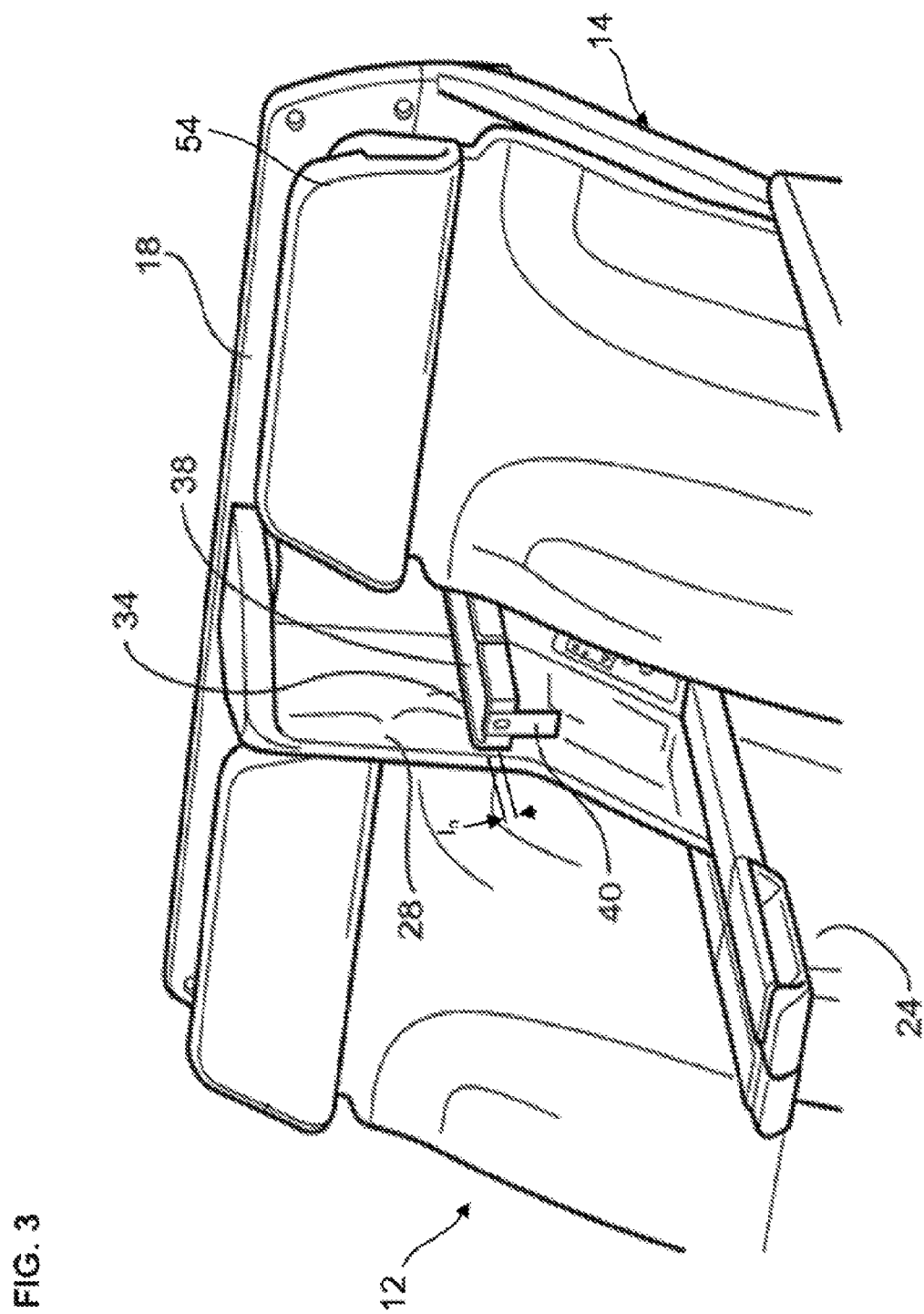
FIG. 3 is a detailed view of the seating group showing the deployable shelf fully deployed to a horizontal position, according to certain aspects of the disclosure.
Figure 4:
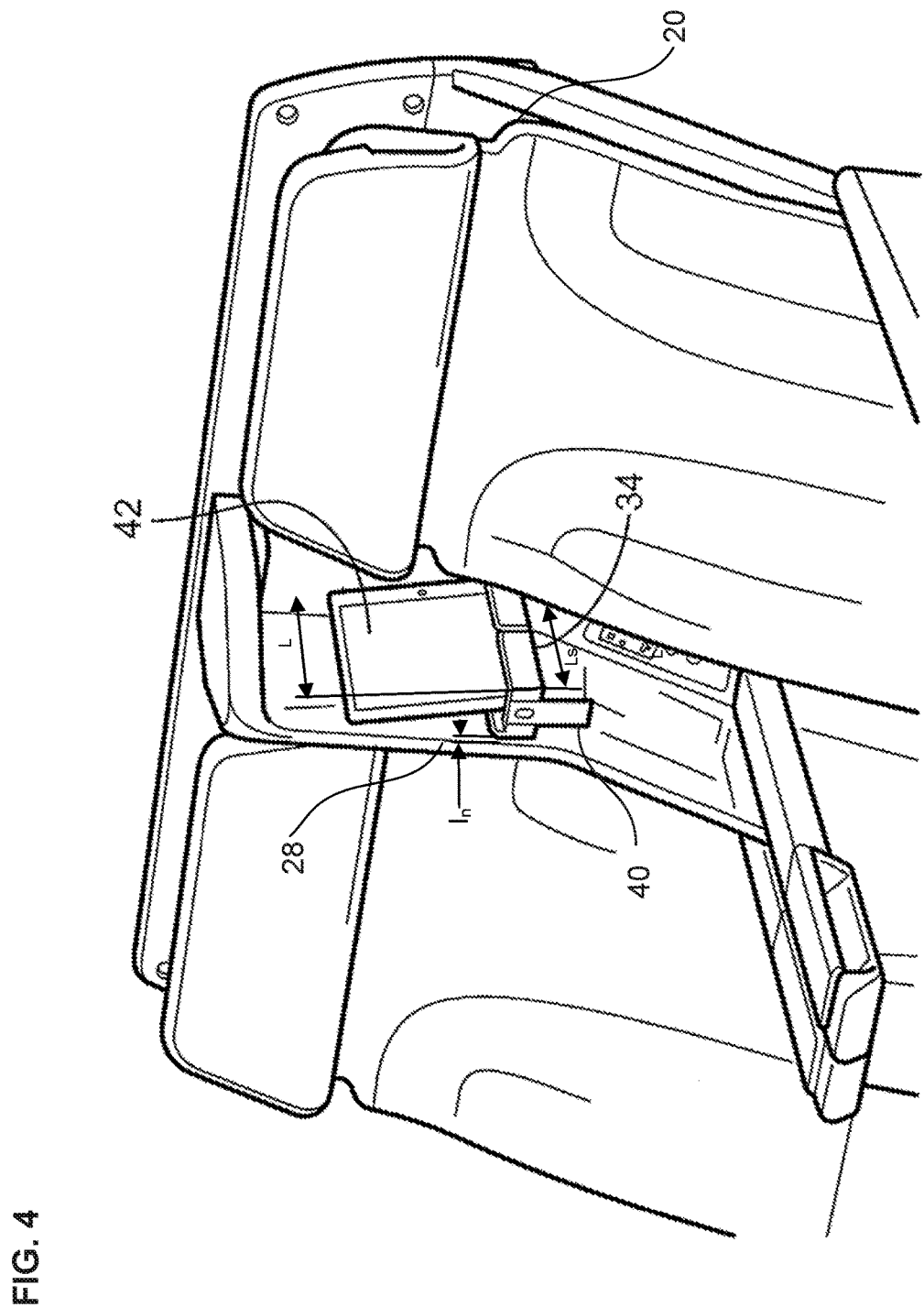
FIG. 4 is a detailed view of the seating group showing an electronic device in a horizontal orientation on the deployed shelf, according to certain aspects of the disclosure.

Referring now to FIGS. 2 and 3, in some embodiments, the shelf 34 is a deployable shelf which can be articulated from a stowed position to deployed position, and vice-versa. For example, in the stowed position the deployable shelf 34 is positioned against or within the rear privacy shell 18 (e.g., illustrated in FIG. 2 as moving between deployed and stowed position), while in the deployed position the deployable shelf 34 is substantially horizontal, as illustrated in FIG. 3. Particularly, in the deployed position, the deployable shelf 34 may be positioned at about or just below a height of a head of a passenger on one of the passenger seats 12, 14 such that the passenger can view an electronic device 42, e.g. a tablet, cell phone, or the like, as illustrated in FIG. 4, supported on the deployable shelf 34 at a comfortable viewing angle, e.g. at eye level, when the passenger is laying on (or shifted toward) his/her side and facing the deployable shelf 34. As best shown in FIG. 3, when the deployable shelf 34 is in the deployed position the deployable shelf 34, in some embodiments, is vertically below the headrest 54 of the passenger seat 14.

In some implementations, the deployable shelf 34 is a tray designed to securely contain items, e.g. the electronic device 42, glasses, and/or headphones, in the deployed position and in the stowed position. For example, turning to FIG. 3, the tray can include a bottom 36 and sidewalls 38 that extend upwardly from the bottom 36 to hold the items when the deployable shelf 34 is in the stowed position and securely supports the items when the deployable shelf 34 is in the deployed position. In one example, the sidewalls 38 may be solid surfaces provided on peripheral sides of the bottom 36, such as on a front side facing a fore seat to prevent the items from sliding off the bottom 36 when the deployable shelf 34 is articulated from the stowed position to the deployed position and/or along a passenger side facing the passenger to prevent the items from sliding off the bottom 36 towards the passenger. In another example, the sidewalls 38 may be rails provided along a periphery of the bottom 36 that is opposite to the upper console portion 28 to maintain the items on the bottom 36 and to have the items visually detectable by the passenger. In a further example, the sidewalls 38 may include openings or perforations to encourage air flow and avoid overheating of electronic devices.

Turning to FIG. 2, in some embodiments, the deployable shelf 34 includes a pivoting system 340 to articulate the deployable shelf 34 from the stowed position to the deployed position, and vise-versa. For example, the pivoting system 340 can include an hinge 342 that connects an aft end of the deployable shelf 34 to the rear privacy wall 18 such that the deployable shelf 34 pivots from the stowed position to the deployed position, and vice-versa, around a rotation axis R substantially perpendicular to the upper console portion 28. In addition, the pivoting system 342 can include a stop 344 to maintain the deployable shelf 34 in the deployed position.

In some implementations, the deployable shelf 34 includes a handle 40 or other graspable fixture to facilitate the articulation of the deployable shelf 34 from the stowed position to the deployed position, and vice-versa, by the passenger. In one example, the handle 40 can be a folding handle placed at a fore portion of the deployable shelf 34. The folding handle can be configured to be flush with the bottom 36 of the deployable shelf 34 when not in use, as illustrated in FIG. 2, and to protrude from the bottom 36 of the deployable shelf 34 when in use, as illustrated in FIG. 3. In another example, the handle 40 can be an indentation placed on an external portion of the bottom 36 that points in a fore direction when the deployable shelf 34 is in the stowed position. The indentation can be designed to receive a finger of the passenger and provide grip to articulate the deployable shelf 34 from the stowed position to the deployed position. In another example, the handle 40 can have similar aspects as a pull tab and be characterized with a low profile to provide aesthetic appeal, e.g. protruding from the deployable shelf 34 with a distance smaller than 5 cm, and with an accent color and/or a contrasting color to be easily noticeable by a passenger, e.g. neon red, yellow, or the like.

In other implementations (not illustrated), one of the upper center console 28 and the lower console 24 includes a release mechanism for triggering release of the deployable shelf 34. The release mechanism, in some examples, may include a button or toggle for causing deployment of the deployable shelf 34.

Figure 5:
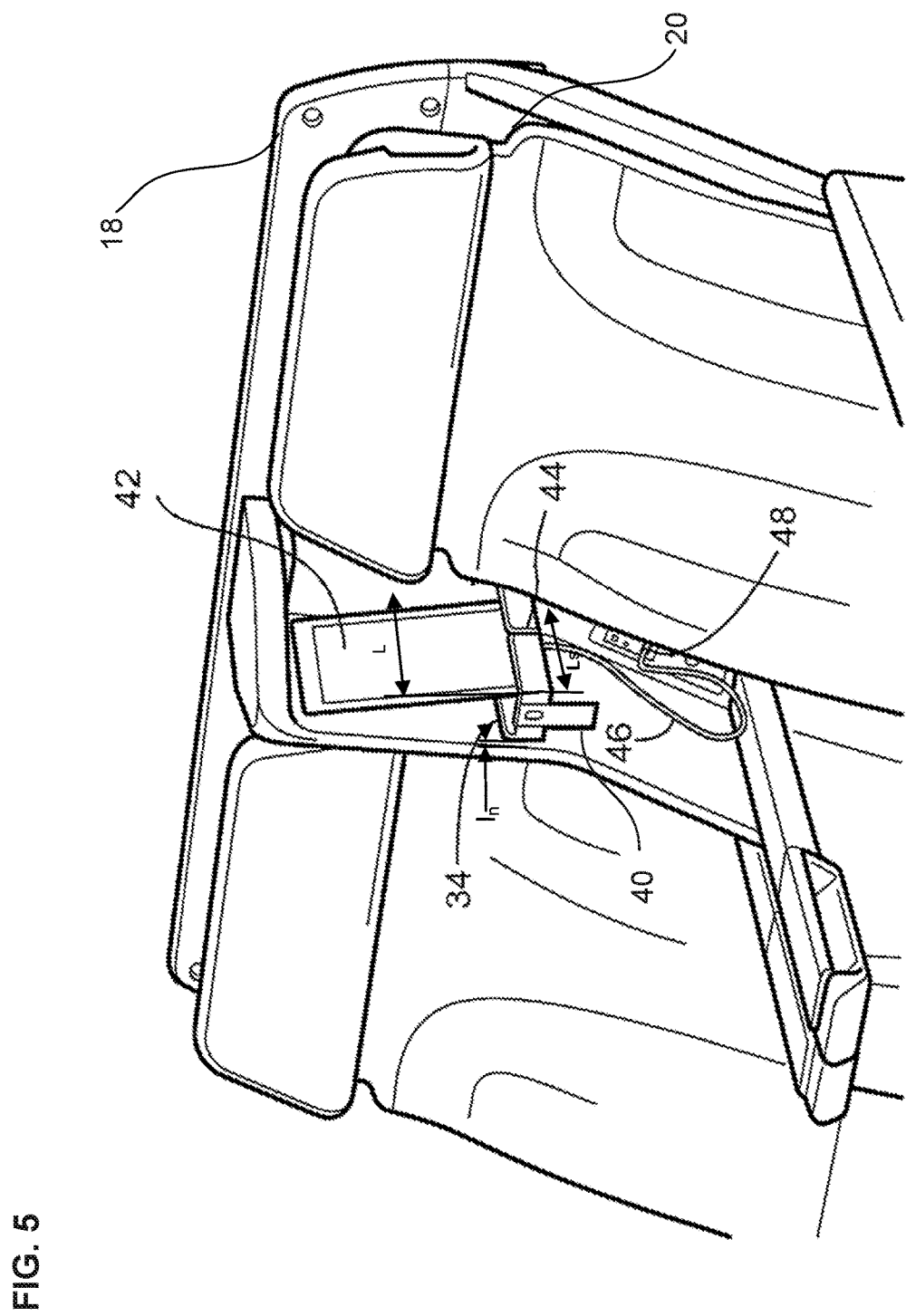
FIG. 5 is a detailed view of the seating group showing the electronic device in a vertical orientation on the deployed shelf, according to certain aspects of the disclosure.

In some implementations, dimensions of the deployable shelf 34 provide for positioning of standard electronic devices (smart phones, tablets, etc.) in both a horizontal and vertical orientation. Referring now to FIG. 4, the electronic device 42 is illustrated in a horizontal orientation supported on the deployable shelf 34 in the deployed position to have a screen of the electronic device 42 positioned at the eye level of the passenger sitting or lying facing the upper console portion 28. The passenger may orient the electronic device in the horizontal orientation, for example, to watch movies. Referring now to FIG. 5, the electronic device 42 is illustrated in vertical orientation supported on the deployable shelf 34 in the deployed position to have the screen at the eye level of the passenger lying facing the upper console portion 28. In a particular example, as illustrated in FIGS. 4 and 5, the deployable shelf 34 may have a deployed length L, (e.g. distance from the rear privacy shell 18 to a fore extremity of the deployable shelf 34) and a tray length $L_S$ (e.g. distance from the handle 40 to a aft extremity of the deployable shelf 34) sufficient to position the electronic device 42 supported thereon forward of the seat back 20 while in either the vertical or horizontal position such that the passenger laying on his/her side and facing the upper console portion 28 has an unobstructed view of the entire screen of the electronic device 42. For example, the deployed length L can be between 200 mm and 400 mm, particularly between 250 mm and 350 mm, and preferably between 275 mm and 325 mm. and the tray length $L_S$ can be between 100 mm and 300 mm, particularly between 125 mm and 275 mm, and preferably between 200 mm and 250 mm.

In addition, the deployable shelf 34 may be positioned relative to the vertical partition 28 with an inter-space $I_n$ such that the electronic device 42 can lean against the vertical partition to hold the electronic device 42 substantially upright. For example, the inter-space $I_n$ can be between 1 mm and 50 mm and preferably between 5 mm and 10 mm.

Figure 6:
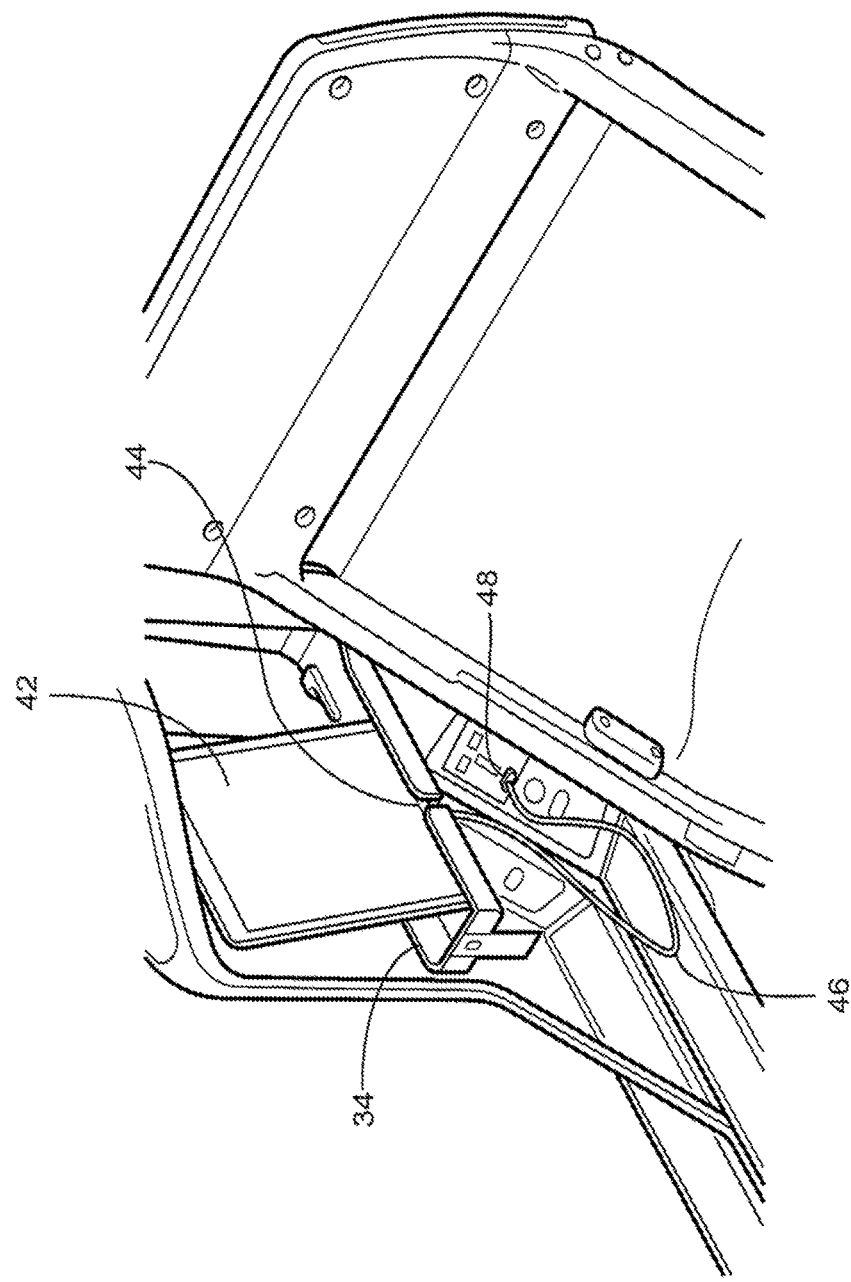
FIG. 6 is a detailed view of the center console showing a data/power cable of the electronic device routed through a cable passage and connected to an electronic port located in the center console, according to certain aspects of the disclosure.

Referring now to FIGS. 5 and 6, in some implementations, the deployable shelf 34 includes a cable passage 44 to allow cabling 46 (e.g., USB cable, headphone cable, etc.) to pass therethrough, for example for connection below the deployable shelf 34 to a data/power port or audio jack when the electronic device 42 is sitting on the shelf 34. For example, the cable passage 44 can be an opening that interrupts the sidewalls 38 of the deployable shelf 34 along one side. As shown, the cabling 46 connected to the bottom of the electronic device 42 passes through the cable passage 44 and connects to a port 48, e.g. USB port, micro-USB port, power port, audio port, or the like, positioned beneath the deployable shelf 34. The cable passage 44 thus manages the cable 46, allowing the electronic device 42 to be oriented substantially vertically while keeping the cable 46 out of the way of the passenger.

Figure 7:
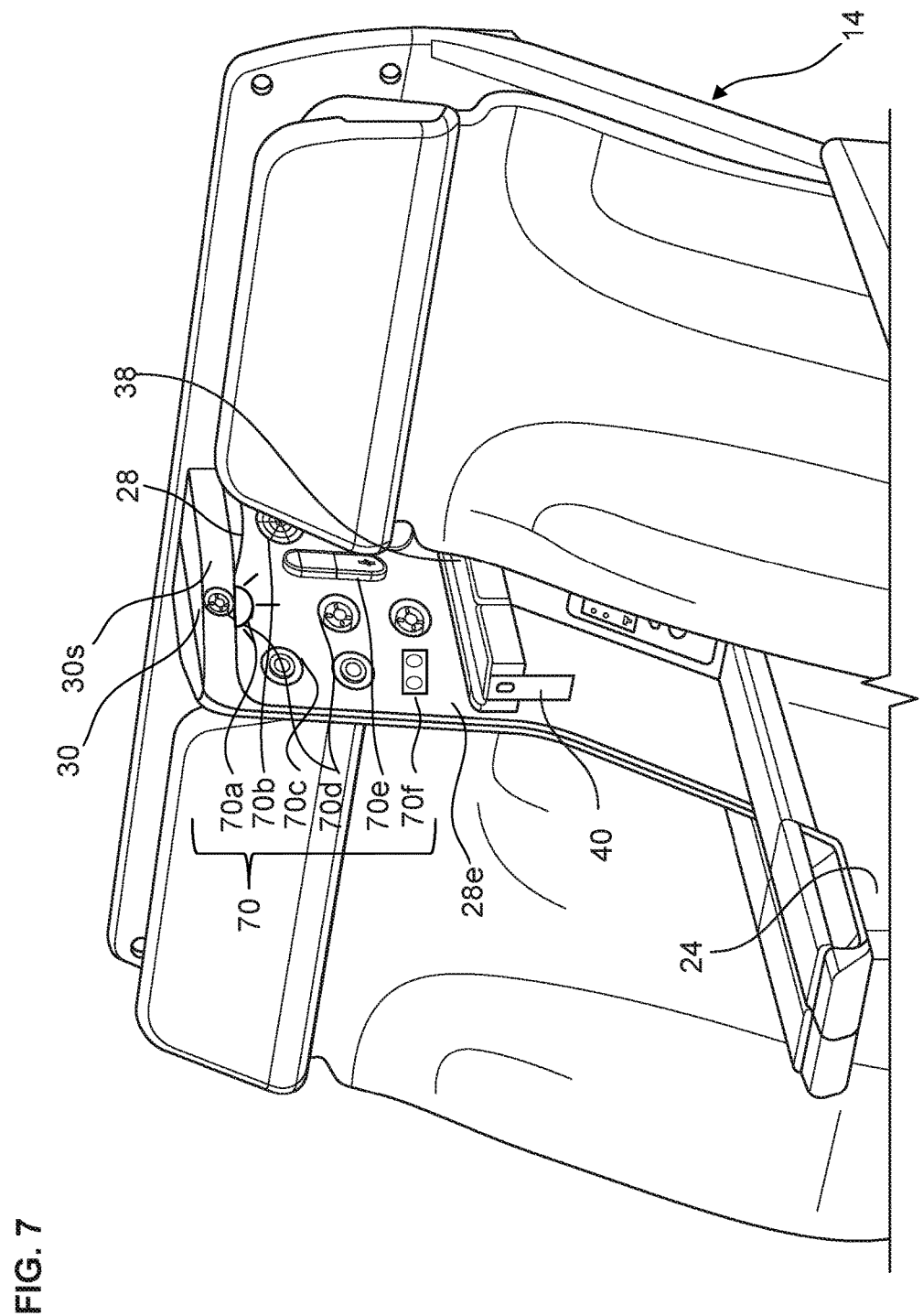
FIG. 7 is a perspective view of the seating group showing the center console with auxiliary controls, according to certain aspects of the disclosure.

Referring now to FIG. 7, in some embodiments, the center console 16 includes auxiliary controls 70 to provide more comfort to a passenger sitting on the passenger seat 14. In some examples, the auxiliary controls 70 can include, but are not limited to, passenger lights 70a, speakers 70b, call buttons 70c, vent nozzles 70d, passenger signs 70e, and electrical inputs/outputs 70f.

In other examples, the auxiliary controls 70 can include flight attendant call buttons, visual signs, e.g. do not disturb indicators, no smoking signs, buckle belt signs, or the like, light controls, e.g. dimmer switches, and/or seat controls, e.g. electric or mechanical actuators to enable an articulation of the passenger seat 14.

In some embodiments, the auxiliary controls 70 can have positions on the center console 16 accessible by the passenger sitting on the passenger seat 14, and be relevant for the usage of the electronic device 42 placed in the deployable shelf 34 and/or to be easily accessible and visible by the passenger on the passenger seat 14. In one example, the auxiliary controls 70 can be placed below the roof 30 of the center console 16 to face the deployable shelf 34 when the deployable shelf 34 is in the deployed position, as illustrated in FIG. 7 for the passenger lights 70a.

In other implementations, at least a portion of the auxiliary controls 70 can be placed on an external surface 28e of the upper console portion 28 that faces the passenger seat 14 to be in a close proximity from a head of the passenger, as illustrated in FIG. 7 for the speakers 70b.

In further implementations, at least a portion of the auxiliary controls 70 can be placed on a side surface 30s of the roof 30 to be positioned above the head of the passenger on the passenger seat 14. For example, auxiliary controls 70 may be positioned on the side surface 30s to better project light, vent air, and/or diffuse sound towards the passenger. In a particular example, as illustrated in FIG. 7, vent nozzle 70d is positioned upon the side surface 30s to direct air toward the passenger.

Figure 8A:
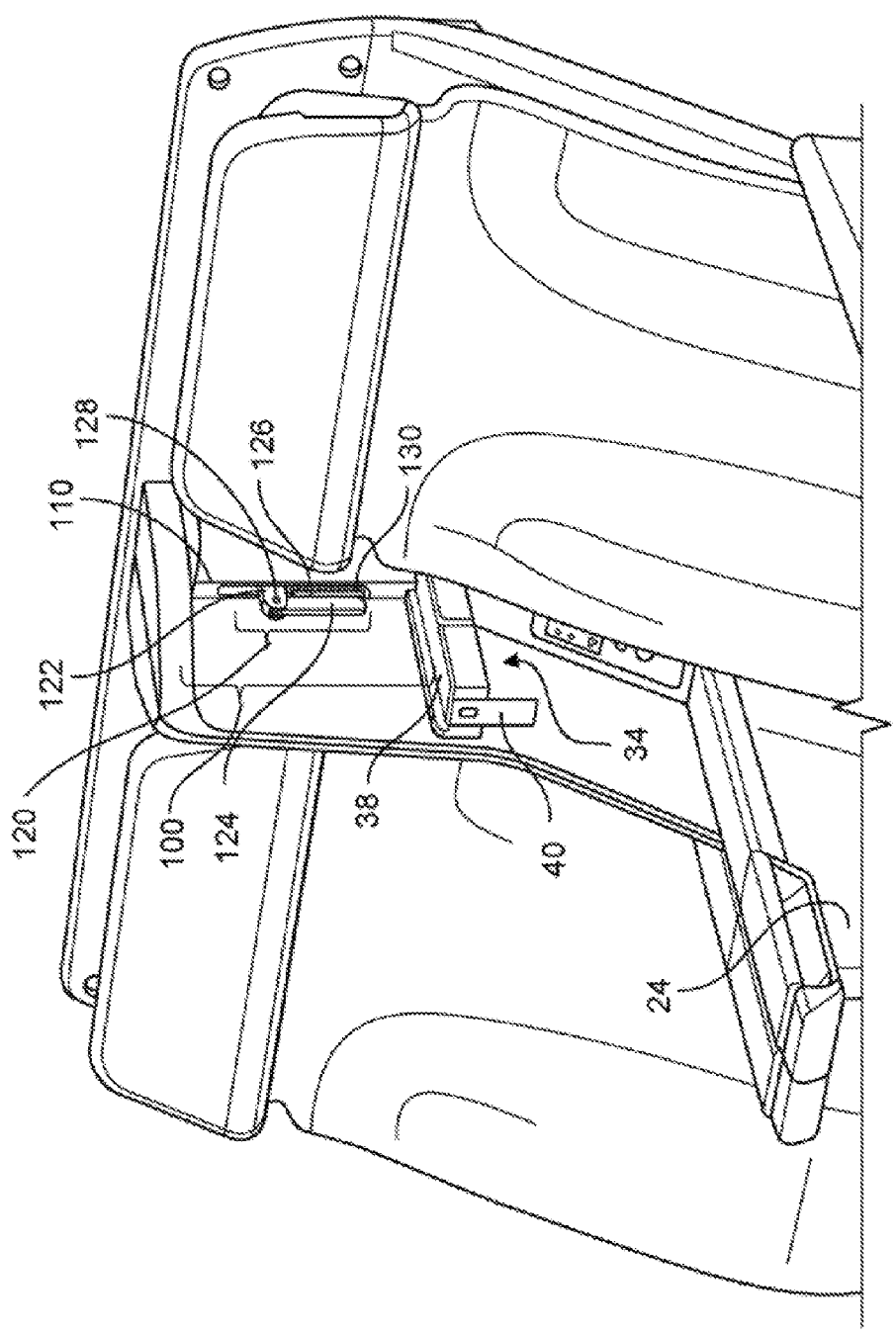
FIG. 8A is a perspective view of the seating group showing the center console with a retention system in a folded position, according to certain aspects of the disclosure.
Figure 8B:
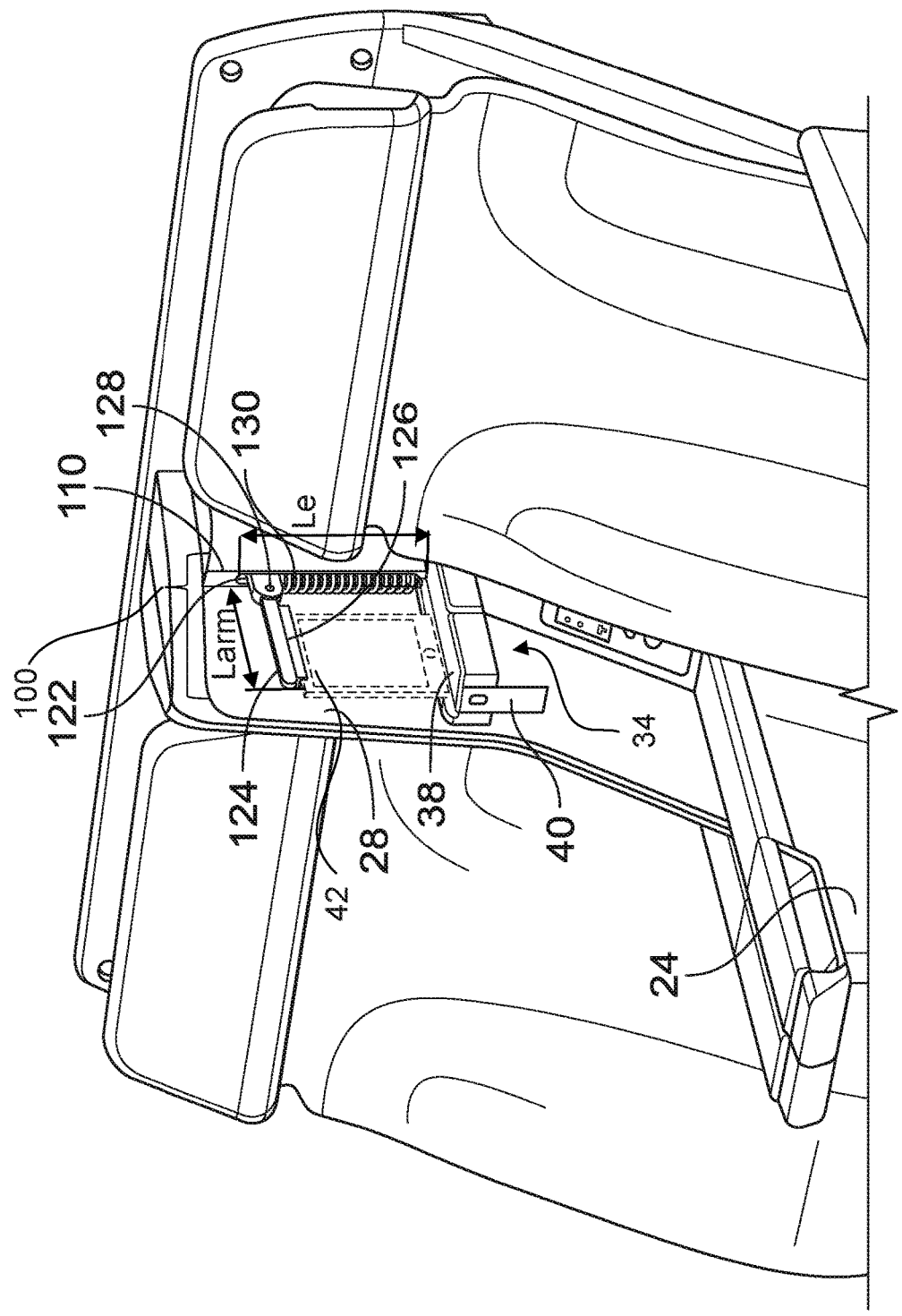
FIG. 8B is a perspective view of the seating group showing the center console with the retention system in an unfolded position and holding the electronic device, according to certain aspects of the disclosure.

Referring now to FIGS. 8A-8B, in some embodiments, the center console 16 includes a retention system 100 designed to maintain the electronic device 42 on the deployable shelf 34 and to prevent the electronic device from falling off the deployable shelf 34 when the aircraft undergoes perturbations, e.g. flight turbulences and/or decelerations. For example, the retention system 100 can include a groove 110, an arm 120 inserted in the groove 110, and a tensioner 130 inside the groove 110 that connects the arm 120 with a lower part of the groove 110 to generate a pulling force on the arm 120 that is directed downwardly. The groove 110, for example, may be disposed in a rear section of the center console 16 or in the inside the rear privacy shell 18. The arm 120 can include a base 122 slidably affixed to the groove 110 and a finger 124 affixed to the base 122. The arm 120 of the retention device 100 can be slid along the groove 110 from a relaxed position to a stretched position by an action of the passenger. Once the arm 120 is in the stretched position, the electronic device 42 can be inserted between the bottom 36 of the deployable shelf 34 and the finger 124 of the arm 120, and the electronic device can be maintained in place by the pulling force exerted by the tensioner 130 onto the electronic device 42, as illustrated in FIG. 8B.

The tensioner 130 and the groove 110, in some implementations, can be designed to provide an elongation Le between the relaxed position and the stretched position sufficiently long to accept a majority of electronic devices. For example, Le can be between 1 cm and 20 cm, and particularly between 5 cm and 15 cm.

The tensioner 130 can also be designed to provide a pulling force magnitude sufficiently high to maintain the electronic device on the deployable shelf 34 but sufficiently small to be overcome by the passenger to articulate the arm 120 from the relaxed position to the stretched position with comfort and without damaging the electronic device. For example, the tensioner 130 can be a mechanical spring, a gas spring, an elastic material, or the like, to generate the pulling force magnitude between 1N and 10N, and preferably between 2 N and 6N.

The arm 120 can have an arm length Larm sufficiently large to grip adequately a majority of electronic devices but sufficiently small to not be cumbersome, e.g. by being longer than the deployable shelf 34. For example, the arm length Larm can be between 1 cm and 20 cm, and preferably between 5 cm and 10 cm.

The finger 124, in some implementations, includes a padded portion 126. The padded portion 126 of the finger 124 can be designed to provide grip to the electronic device 42 and prevent damage. For example, the padded surface portion can have a concave surface to receive a side of the electronic device 42 and can be made from energy absorbing materials such as rubber alloys, plastic alloys, neoprene alloys, or the like.

Figure 9A:
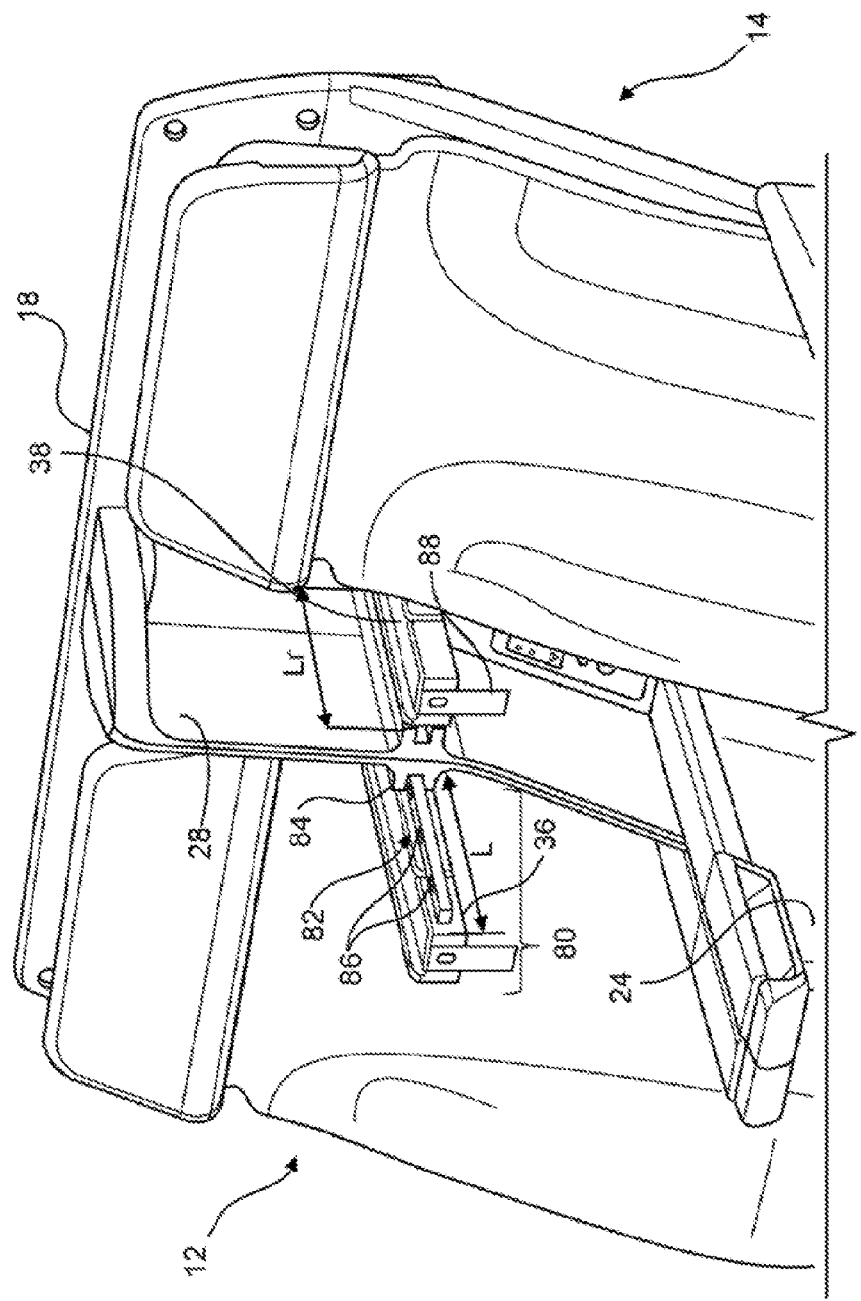
FIG. 9A is a perspective view of the seating group with a slidable shelf in a drawn-out position, according to certain aspects of the disclosure.

In some implementations, the finger 124 is connected to the base 122 with a pivot 128, e.g. hinge, shaft, or the like, to be articulated from a folded position, as illustrated in FIG. 9A, to an unfolded position, as illustrated in FIG. 8B, and vice-versa, by the passenger. In the folded position, the finger 124 in placed against the groove 110 to save space and allow the shelf 34 to be placed in the stowed position, while in the unfolded position the finger 124 protrudes from the rear of the center console 16 (or rear privacy shell 18) substantially parallel to the deployable shelf 34 in the deployed position.

The center console 16, in some embodiments, generally functions to provide a degree of privacy to laterally-adjacent passengers. While only one side of the center console 16 is shown, it is envisioned that deployable shelves may be positioned to either side of the upper console portion 28 such that laterally-adjacent passengers each have access to a deployable shelf. Each side of the center console 16 may also have its own seat and media controls located in a control panel vertically below the deployable shelf.

Figure 9B:
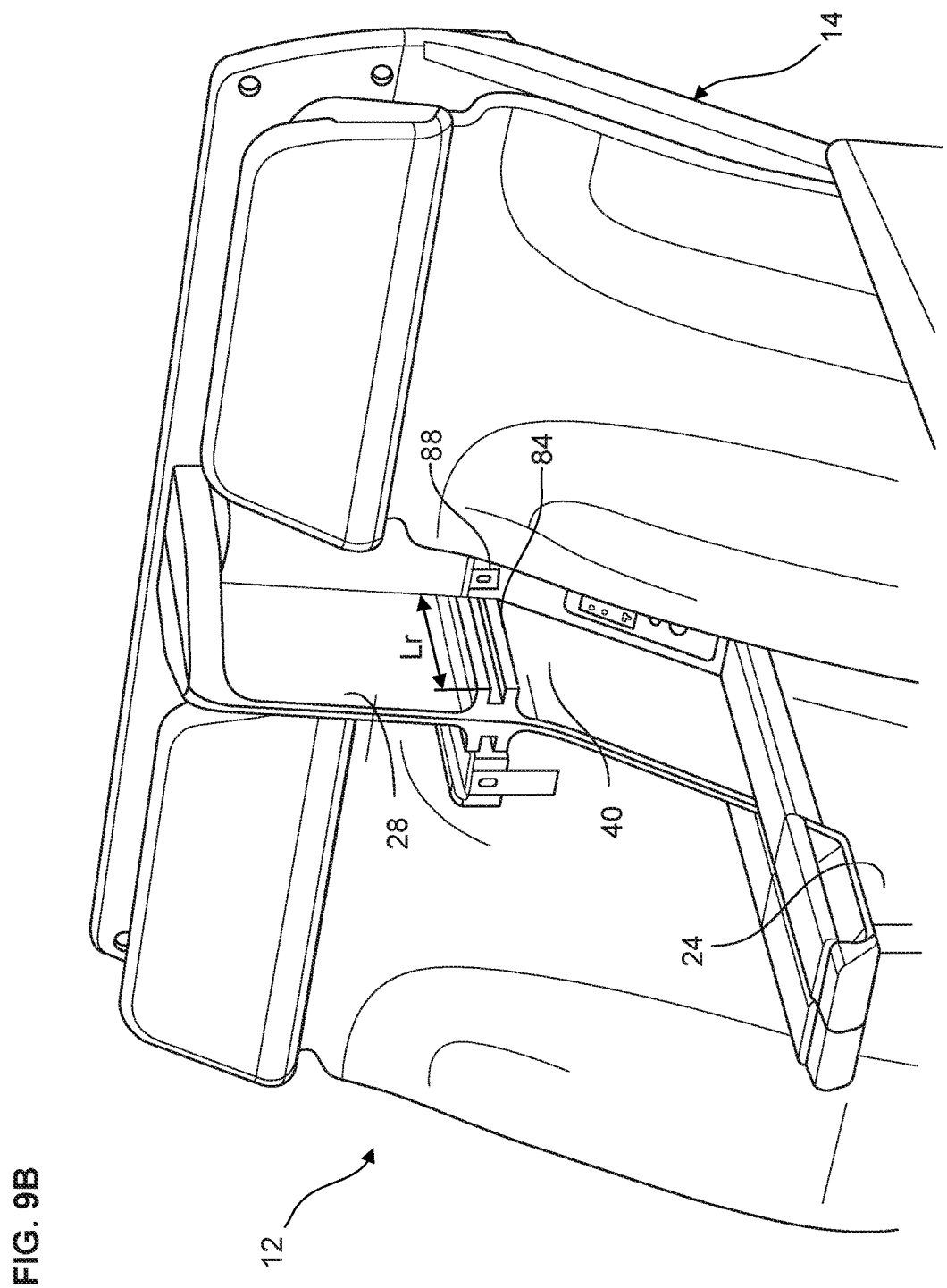
FIG. 9B is a perspective view of the seating group with the slidable shelf in a drawn-in position, according to certain aspects of the disclosure.

Referring now to FIGS. 9A-9B, in some implementations, the center console 16 includes a slidable shelf 80. For example, the slidable shelf 80 can be articulated from a drawn-out position, as illustrated in FIG. 9A, to a drawn-in position, as illustrated in FIG. 9B, and vice-versa, by a sliding motion that may be performed by the passenger in the passenger seat 14. In the drawn-out position, the slidable shelf 80 protrudes substantially perpendicularly from the rear privacy shell 18 or rear of the console 28 along a deployable length L, as illustrated in FIG. 9A, while in the drawn-in position the slidable shelf 80 is fully retracted within the rear privacy shell 18, as illustrated in FIG. 9B.

In the drawn-out position, in some implementations, the slidable shelf 80 can be positioned at about or just below a height of a head of the passenger sitting on the passenger seat 14 such that the passenger can view an electronic device placed on the slidable shelf 80 at a comfortable viewing angle (e.g., at eye level) when the passenger is laying on his/her side and/or facing the slidable shelf 80.

The articulation of the slidable shelf 80 from the drawn-in position to the drawn-out position, and vice-versa, in some implementations, is implemented by a sliding mechanism 82 that can be operated by the passenger. For example, the sliding mechanism 82 can include a rail 84 affixed and/or grooved in the upper console portion 28 along a rail length Lr, and a series of rollers 86 supported by the slidable shelf 80 and slidably affixed to the rail 84.

In some implementations, the slidable shelf 80 can include a handle 88 to facilitate the articulation of the slidable shelf 80 from the drawn-in position to the drawn-out position, and vice-versa, by the passenger. In one example, the handle 88 can be a folding handle placed at a fore portion of the slidable shelf 80. The folding handle can be configured to be flush with the bottom 36 of the deployable shelf 34 when not in use, and to protrude from the bottom 36 of the slidable shelf 80 when in use. In another example, the handle 88 can be configured as an indentation placed on an external portion of the bottom 36 that points downwardly. The indentation can be designed to receive a finger of the passenger and provide grip to articulate the slidable shelf 80 from the drawn-in position to the drawn-out position. In other implementations, the center console 28 may include a control (e.g., button or toggle) for releasing the slidable shelf 80 from its retracted position.

Figure 10A:
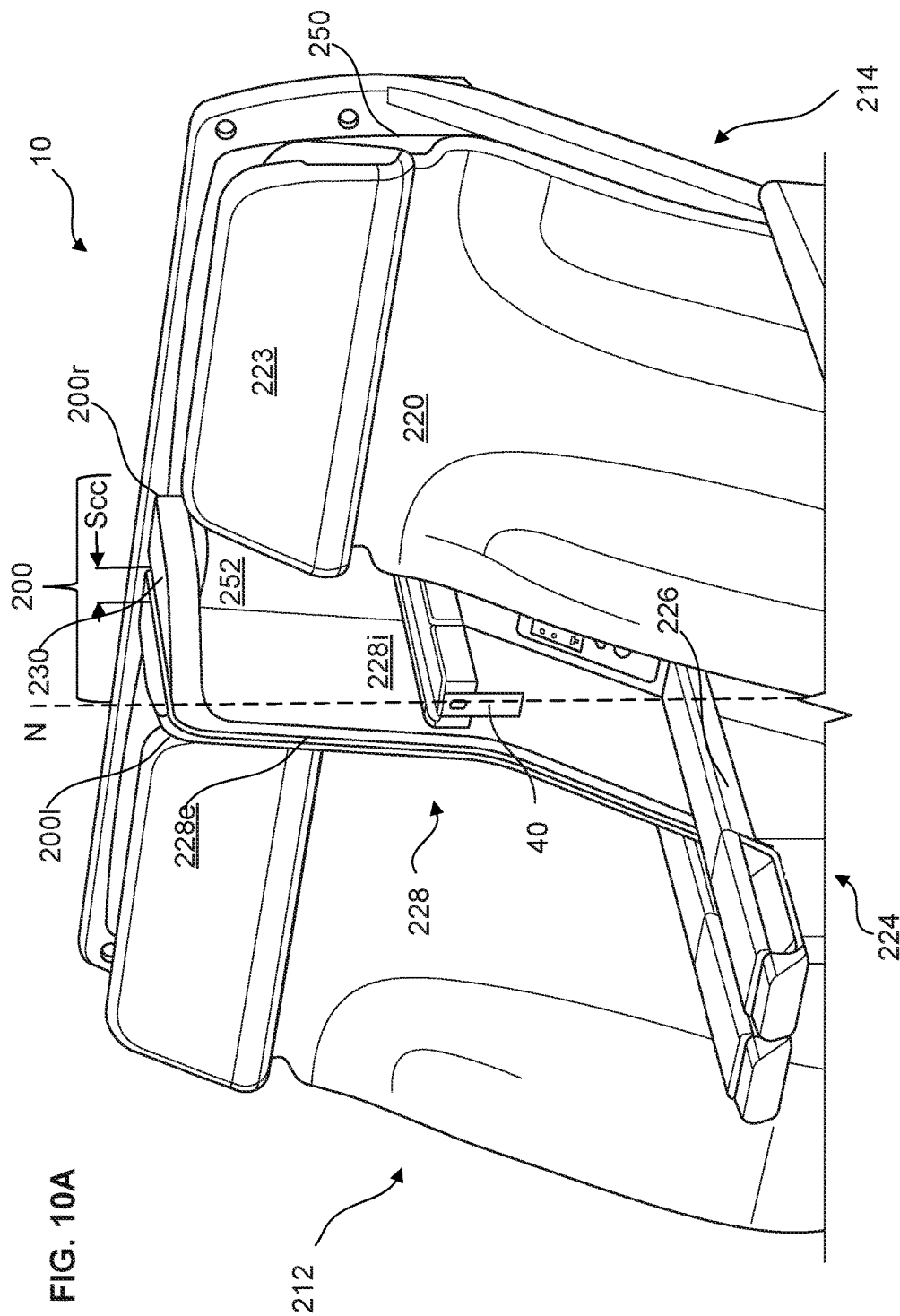
FIG. 10A is a perspective view of the seating group including laterally-adjacent seats separated by a pair reclinable center console in a upright position, according to certain aspects of the disclosure.
Figure 10B:
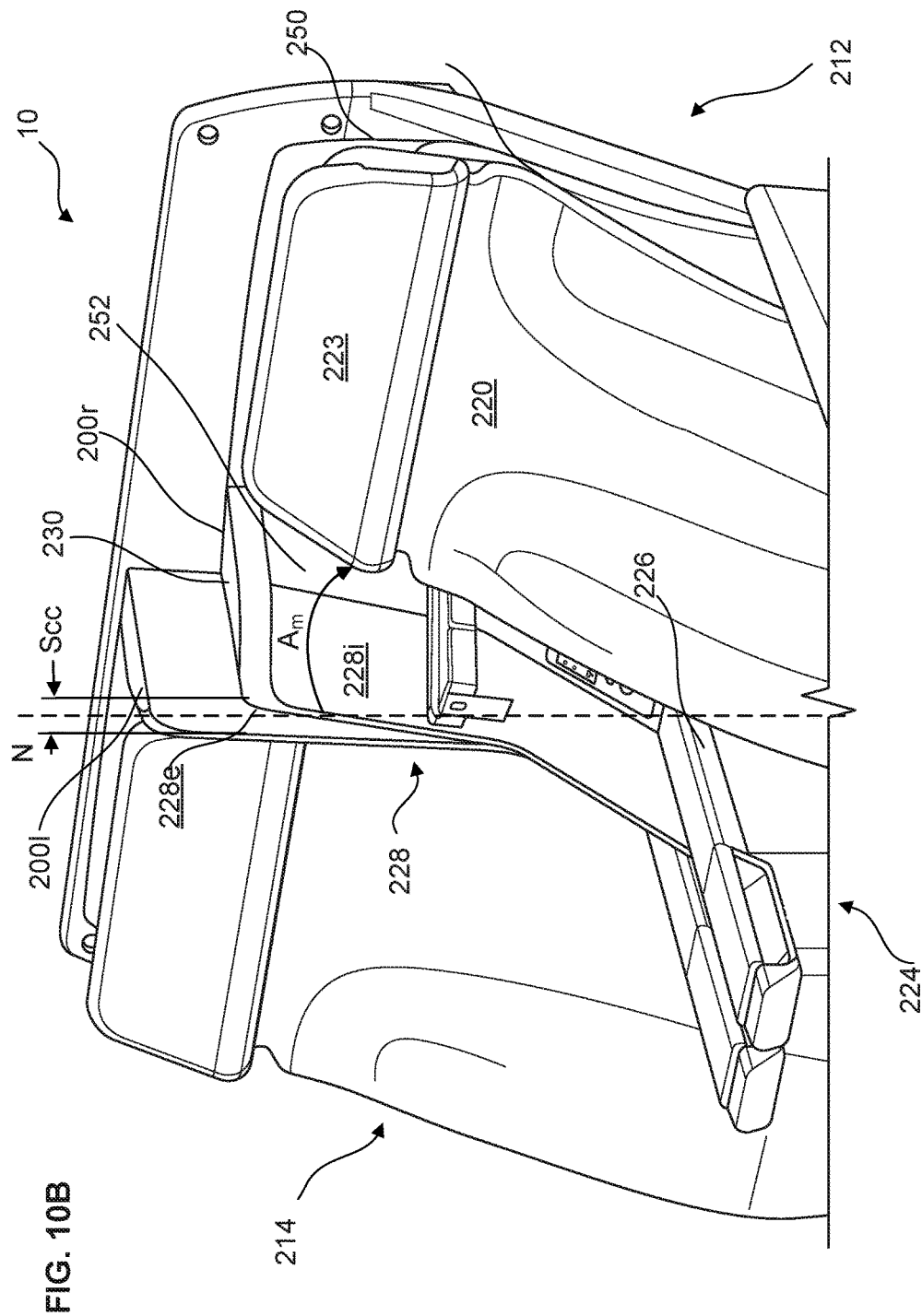
FIG. 10B is a perspective view of the seating group including laterally-adjacent seats separated by the pair reclinable center console in a reclined position, according to certain aspects of the disclosure.

Referring now to FIGS. 10A-10B, in some implementations, the seating group 10 includes a pair of reclinable center consoles 200 between a first and a second passenger seat 214, 212, laterally adjacent to each other, to provide better comfort and/or privacy. For example, the pair of reclinable center consoles 200 can include a first reclinable center console 200r affixed to the first passenger seat 214 to follow an articulation of the first passenger seat 214 and/or a second reclinable center console 200l affixed to the second passenger seat 212 to follow an articulation of the second passenger seat 212. The first passenger seat 214 can include a seat back 220, a headrest 223 above the seat back 220, and an armrest 226. The seat back 220 can include a seat back shell 250 configured to support the seat back 220. In some implementations, the seat back shell 250 is configured to articulate with the seat back 220 from an upright position to a reclined position. In the upright position, the seat back 220 can be substantially parallel to a vertical plane N, as illustrated in FIG. 10A, while in the reclined position the seat back 220 is inclined in the aft direction and forms a predetermined inclination angle $A_m$ with the vertical plane N, as illustrated in FIG. 10B. For example, the predetermined inclination angle $A_m$ can be between 0° and 45°, and particularly between 0° and 30°.

The articulation from the upright position to the reclined position, and vice-versa, can be performed through a pivot system (not shown) relying on bearings, shafts, motorized actuators, springs, or any other elements and/or mechanism known by a person having ordinary skill in the art.

The seat back shell 250, in some embodiments, includes a console support portion 252 that protrudes laterally from the seat back 220 and above the head rest 223 of the first passenger seat 214. The console support 252 for example, may be designed, to support the first inclinable console 200r and to articulate the first inclinable console 200r in concert with the articulation of the seat back 220 from the upright position to the reclined position so as to provide better comfort and/or privacy to the passenger on the first passenger seat 214.

As illustrated in FIGS. 10A and 10B, the first inclinable console 200r, in some embodiments, includes a lower console portion 224, an upper console portion 228, and a roof 230. The upper console portion 228 extends vertically upward from the lower console portion 224 to about a top of the console support portion 252, and from the console support portion 252 forward about half of a length of the lower console portion 224. The upper console portion 228 can include an internal surface 228i that faces the first passenger seat 214 and an external surface 228e that faces the second passenger seat 212.

In some embodiments, a top portion of the upper console portion 228 extends from the internal surface 228i and from the console support portion 252 towards the first seat 214 to form a roof 230 that further defines an underlying console space.

The upper console portion 228, the roof 230, and the lower console portion 224, in some embodiments, are affixed to the console support portion 252 to be articulated with the seat back 220 from the upright position to the reclined position, and vice-versa, and follow the passenger on the first passenger seat 214.

As illustrated in FIG. 10A, in some embodiments, the first inclinable console 200r is configured to provide an external console spacing Scc between the external surface 228e and the second inclinable console 200l or any other elements of the aircraft, e.g. walls, to generate sufficient clearance in a vicinity of the external surface 228e and allow the right inclinable console 200r to be articulated independently from the second inclinable console 200l or any other elements of the aircraft.

The back seat shell 250 and the console support portion 252, in some embodiments, are formed from lightweight, durable, and stiff materials such as plastic alloys, e.g. plastic alloys, vacuum formed plastics, Delrin, and/or metallic alloys, e.g. aluminum alloys, to provide support for the back seat 220 and the pair of inclinable consoles 200. Additionally, the back seat shell 250 and/or the console support portion 252 can be manufactured through thermoforming methods such as vacuum forming.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

What is claimed is:

1. An aircraft seating group, comprising:
   first and second laterally-adjacent passenger seats; and
   a center console positioned between the first and second laterally-adjacent passenger seats, wherein the center console comprises:
   a vertical partition positioned substantially between a headrest region of the first passenger seat and a headrest region of the second passenger seat, the vertical partition including a first portion extending in a direction away from a rear shell positioned behind at least the first passenger seat, and a second portion extending laterally along the rear shell, and
   a shelf extending horizontally in a forward direction from a front face of the second portion of the vertical partition above an arm rest for the first passenger seat and below the headrest region of the first passenger seat;
   wherein the shelf extends horizontally along a lateral face of the first portion of the vertical partition below the headrest region of the first passenger seat and is configured to support a handheld electronic device at approximately an eye level of a passenger in the first passenger seat.

2. The aircraft seating group of claim 1, wherein the center console is affixed to the rear shell.

3. The aircraft seating group of claim 2, wherein the rear shell is a rear privacy shell spanning the aircraft seating group.

4. The aircraft seating group of claim 2, wherein the center console is configured to recline with the seat back of the first passenger seat.

5. The aircraft seating group of claim 1, wherein the center console comprises:
   an upper console portion; and
   a lower console portion, wherein
   the upper console portion comprises the vertical partition and the shelf, and
   the lower console portion comprises the arm rest for the first passenger seat.

6. An aircraft seating apparatus, comprising:
   a rear privacy shell configured for positioning behind at least one of a first passenger seat and a second passenger seat laterally-adjacent to the first passenger seat; and
   a center console affixed to the rear privacy shell, wherein the center console is disposed for positioning between the first and second passenger seats, the center console comprising:
   a vertical partition positioned substantially between a headrest region of the first passenger seat and a headrest region of the second passenger seat, the vertical partition including a first portion extending in a forward direction away from the rear privacy shell and a second portion extending laterally along the rear privacy shell, and
   a shelf extending horizontally in a forward direction from a front face of the second portion of the vertical partition above an arm rest for the first passenger seat and below the headrest region of the first passenger seat;
   wherein the shelf extends horizontally along a lateral face of the first portion of the vertical partition below the headrest region of the first passenger seat and is configured to support a handheld electronic device at approximately an eye level of a passenger in the first passenger seat.

7. The aircraft seating apparatus of claim 6, wherein:
   the shelf comprises a joint mechanism proximate the rear privacy shell; and
   the shelf is deployable from a vertical position substantially aligned with the rear privacy shell to a horizontal position along the vertical partition.

8. The aircraft seating apparatus of claim 7, wherein the joint mechanism is mounted to the rear privacy shell.

9. The aircraft seating apparatus of claim 6, wherein:
   the center console comprises a second shelf extending horizontally in a forward direction from the front face of the second portion of the vertical partition, wherein the second shelf is disposed for positioning above an arm rest of the second passenger seat and below the headrest region of the second passenger seat, wherein the second shelf extends horizontally along an opposing lateral face of the first portion of the vertical partition below the headrest region of the second passenger seat, and wherein the second shelf is configured to support another handheld electronic device at approximately an eye level of another passenger in the second passenger seat.

10. A center console for mounting above an armrest of a first passenger seat and between a headrest region of the first passenger seat and a second passenger seat laterally-adjacent to the first passenger seat, the center console comprising:

a vertical partition configured to extend between the first passenger seat and the second passenger seat, the vertical partition including a first portion extending in a forward direction away from a rear privacy shell positioned behind the center console, and a second portion extending laterally along the rear privacy shell; and a shelf extending horizontally forward from the second portion of the vertical partition;

wherein the shelf is configured to extend horizontally in a forward direction along a lateral face of the first portion of the vertical partition below the headrest region of the first passenger seat to support a handheld electronic device at approximately an eye level of a passenger in the first passenger seat.

11. The center console of claim 10, wherein the shelf is configured to be slid from a drawn-in position to a drawn-out position, wherein:

in the drawn-in position the shelf is fully retracted proximate a rear privacy shell configured for positioning behind at least one of the first passenger seat and the second passenger seat; and in the drawn-out position the shelf protrudes along the vertical partition.

12. The center console of claim 10, wherein:

the shelf comprises a bottom panel with at least two upwardly extending sidewalls, wherein each sidewall of the at least two upwardly extending sidewalls is disposed along a respective side of the bottom panel.

13. The center console of claim 12, wherein at least one of the sidewalls includes a cable passage for allowing a cable to pass therethrough.

14. The center console of claim 10, further comprising a roof panel, wherein the roof panel extends along a top of the vertical partition.

15. The center console of claim 14, wherein at least one auxiliary control is mounted on the roof panel.

16. The center console of claim 15, wherein the at least one auxiliary control includes at least one of a passenger light, a passenger sign, an air vent nozzle, a call button, an audio speaker, an electrical port, and a data port.

17. The center console of claim 14, wherein the shelf has a deployable handle at one end thereof for moving the shelf between the drawn-in and drawn-out positions.

18. The center console of claim 10, further comprising a retention system disposed within a groove of the vertical partition extending between the first passenger seat and the second passenger seat, wherein the retention system is configured to releasably retain the handheld electronic device to the shelf.

19. The center console of claim 18, wherein the retention system comprises a horizontal arm connected to a vertical tensioner within the groove, wherein the vertical tensioner is configured to generate a pulling force on the arm to clamp the electronic device to the shelf.

* * * * *